US008917998B2

(12) United States Patent
Zhang et al.

(10) Patent No.: US 8,917,998 B2
(45) Date of Patent: Dec. 23, 2014

(54) POLARIZATION SWITCHING FOR OPTICAL FIBER COMMUNICATIONS

(71) Applicant: NEC Laboratories America, Inc., Princeton, NJ (US)

(72) Inventors: Shaoliang Zhang, Plainsboro, NJ (US); Lei Xu, Princeton Junction, NJ (US); Junqiang Hu, Davis, CA (US); Fatih Yaman, Monmouth Junction, NJ (US); Ting Wang, West Windsor, NJ (US); Yoshihisa Inada, Tokyo (JP); Takaaki Ogata, Tokyo (JP); Yasuhiro Aoki, Tokyo (JP)

(73) Assignee: NEC Laboratories America, Inc., Princeton, NJ (US)

( * ) Notice: Subject to any disclaimer, the term of this patent is extended or adjusted under 35 U.S.C. 154(b) by 134 days.

(21) Appl. No.: 13/649,161

(22) Filed: Oct. 11, 2012

(65) Prior Publication Data
US 2013/0089327 A1 Apr. 11, 2013

Related U.S. Application Data

(60) Provisional application No. 61/545,822, filed on Oct. 11, 2011.

(51) Int. Cl.
| | | |
|---|---|---|
| H04B 10/04 | (2006.01) | |
| H04B 10/12 | (2006.01) | |
| H04B 10/50 | (2013.01) | |
| H04J 14/06 | (2006.01) | |
| H04B 10/556 | (2013.01) | |

(52) U.S. Cl.
CPC ........... H04B 10/5055 (2013.01); H04J 14/06 (2013.01); H04B 10/5561 (2013.01)
USPC ............ 398/188; 398/182; 398/183; 398/184

(58) Field of Classification Search
USPC .......................................... 398/182–184, 188
See application file for complete search history.

(56) References Cited

U.S. PATENT DOCUMENTS

| | | | | |
|---|---|---|---|---|
| 8,600,199 B2 * | 12/2013 | Morishita | ......................... | 385/3 |
| 2005/0074245 A1 * | 4/2005 | Griffin | ......................... | 398/188 |
| 2006/0093377 A1 * | 5/2006 | Choudhary et al. | .......... | 398/188 |
| 2008/0225937 A1 * | 9/2008 | Farhoodfar et al. | ........... | 375/232 |
| 2009/0201564 A1 * | 8/2009 | Tian et al. | ..................... | 359/239 |
| 2011/0170877 A1 * | 7/2011 | Akiyama | ..................... | 398/185 |

OTHER PUBLICATIONS

Li et al, Electrical Dispersion Compensation for 40 Gb/s DQPSK Signal Utilizing MIMO DFEs (Published in IEEE Photonics Technology Letters, vol. 20, No. 23, pp. 1902-1904, Dec. 2008).*

(Continued)

*Primary Examiner* — David Payne
*Assistant Examiner* — Casey Kretzer
(74) *Attorney, Agent, or Firm* — Joseph Kolodka

(57) ABSTRACT

A method implemented in a transmission apparatus used in an optical fiber communications system for a polarization switched differential quaternary phase-shift keying (DQPSK) signal is disclosed. The method comprises splitting data into two or more data streams, inputting said two or more data streams to 1-bit DQPSK precoders to perform 1-bit DQPSK precoding, and multiplexing inphase outputs of the 1-bit DQPSK precoders to generate a first output; and multiplexing quadrature outputs of the 1-bit DQPSK precoders to generate a second output. Other methods, apparatuses, and systems also are disclosed.

20 Claims, 3 Drawing Sheets

(56) References Cited

OTHER PUBLICATIONS

J. K. Fischer, and K. Petermann, "Performance Analysis of CSRZ-OOK With Pairwise or Pulse-to-Pulse Alternate Polarization", IEEE Photonics Technology Letters, vol. 19, No. 24, December 15, 2007.
Product Brief , SMI4029, http://www.semtech.com/images/datasheet/smi4029.pdf.

* cited by examiner

| $X(k)$ (current input 1) | $Y(k)$ (current input 2) | $I(k)$ (output 1 of precoder) | $Q(k)$ (output 2 of precoder) |
|---|---|---|---|
| 0 | 0 | $\overline{I(k-2)}$ | $\overline{Q(k-2)}$ |
| 0 | 1 | $\overline{Q(k-2)}$ | $I(k-2)$ |
| 1 | 0 | $Q(k-2)$ | $\overline{I(k-2)}$ |
| 1 | 1 | $I(k-2)$ | $Q(k-2)$ |

FIG. 3

POLARIZATION SWITCHING FOR OPTICAL FIBER COMMUNICATIONS

This application claims the benefit of U.S. Provisional Application No. 61/545,822, entitled, "Implementation of 2-bits DQPSK Precoder Using Two SMI4029 Chips for Polarization-Switched DQPSK Signals," filed Oct. 11, 2011, the contents of which are incorporated herein by reference.

BACKGROUND OF THE INVENTION

The present invention relates to polarization switching in the field of optical fiber communications and, more particularly, to special design of bit precoders.

Performance of optical fiber communications is limited by an optical signal-to-noise ratio and fiber nonlinearity. To enhance the fiber nonlinearity tolerance, polarization switching has been proposed to reduce the nonlinear cross-talk between adjacent symbols [1]. The advantages of polarization switching have been demonstrated in experiments. Polarization switching formats requires special design of bit precoders, such as 2-bit precoders for the differential quaternary phase-shift keying (DQPSK) format. A 2-bit DQPSK precoder may work as illustrated in FIG. 3. So far, however, no particular documents have been reported to implement the polarization switching in the field, because no such 2-bits differential precoder is available. At this moment, no product has been developed to perform 2-bit DQPSK precoding. Commercially available differential DQPSK precoders only perform the precoding scheme on a symbol-by-symbol basis. It is very costly to redesign the whole application-specific integrated circuit (ASIC) chips. A 1-bit DQPSK precoder [2] could be re-designed to perform 2-bit differential encoding, though the cost would be much higher than our proposed structure as follows:

We propose to use a combination of discrete components such as commercial 1-bit DQPSK precoders to construct a 2-bit DQPSK precoder, thus enabling the commercial deployment of polarization switched signals in the DQPSK system. It is the first time that a feasible scheme is proposed to allow polarization switching DQPSK being deployed in an actual optical transmission system.

[1] J. K. Fischer, and K. Petermann, "Performance Analysis of CSRZ-OOK With Pairwise or Pulse-to-Pulse Alternate Polarization", IEEE PHOTONICS TECHNOLOGY LETTERS, VOL. 19, NO. 24, DEC. 15, 2007

[2] Product Brief, SMI4029, http://www.semtech.com/images/datasheet/smi4029.pdf

BRIEF SUMMARY OF THE INVENTION

An objective of the present invention is to reduce cost by using discrete components while greatly reducing the development time for re-designing a new ASIC chip, since it may not be necessary to re-design the whole ASIC chip to perform 2-bit DPQSK precoding, according to the present invention.

An aspect of the present invention includes a method implemented in a transmission apparatus used in an optical fiber communications system for a polarization switched DQPSK signal. The method comprises splitting data into two data streams, inputting each of the data streams to a 1-bit differential quaternary phase-shift keying (DQPSK) precoder to perform 1-bit DQPSK precoding, multiplexing inphase outputs of the 1-bit DQPSK precoders to generate a first output, and multiplexing quadrature outputs of the 1-bit DQPSK precoders to generate a second output.

Another aspect of the present invention includes A transmission apparatus used in an optical fiber communications system for a polarization switched DQPSK signal. The transmission apparatus comprises a splitting unit to split data into two data streams, two or more 1-bit differential quaternary phase-shift keying (DQPSK) precoders to perform 1-bit DQPSK precoding for the data streams, a first multiplexer to multiplex inphase outputs of the 1-bit DQPSK precoders to generate a first output, and a second multiplexer to multiplex quadrature outputs of the 1-bit DQPSK precoders to generate a second output.

BRIEF DESCRIPTION OF THE DRAWINGS

FIG. 3 depicts how a 2-bit DQPSK precoder works.

DETAILED DESCRIPTION

With the availability of two commercial 1-bit differential DQPSK precoders, input data is first de-multiplexed into two branches, each of which is differentially encoded independently by a 1-bit differential DQPSK precoder. The outputs of the two 1-bit differential DQPSK precoders are combined together through a 2×1 multiplexer to generate 2-bit differentially encoded DQPSK signals.

Figure 1:
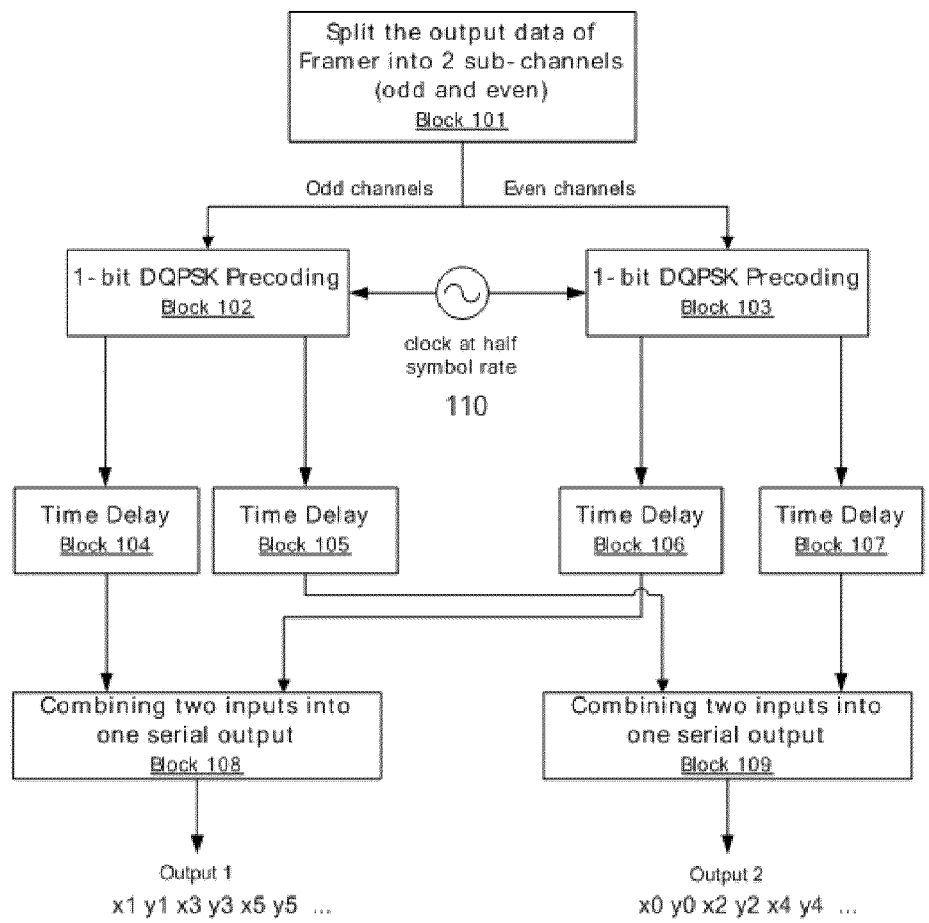
FIG. 1 depicts a flow chart that shows an implementation of a 2-bit DQPSK precoder as a combination of two 1-bit DQPSK precoders.

With reference to FIG. 1, the output data of the framer is first split into odd and even channels (streams) (Block 101). Each channel passes through an independent 1-bit DQPSK precoder (Block 102 or 103) for performing 1-bit encoding. The two independent 1-bit DQPSK precoders are driven by clock 110 at a half symbol rate. The inphase outputs of both 1-bit DQPSK precoders are time-aligned in a pair of time delay units (Blocks 104 and 106) before combining together or multiplexing (Block 108) to generate output 1. The quadrature outputs go to another pair of time delay units (Blocks 105 and 107) and are combined or multiplexed into output 2 (Block 109).

It is worthy of noting that output 1 and output 2 have the following signals:

Output 1: x1 y1 x3 y3 x5 y5 . . .
Output 2: x0 y0 x2 y2 x4 y4 . . .

xn and yn represent the nth data from odd and even channels.

As observed in the outputs, each output has at least part of two independent data streams x and y. Therefore, when performing 2-bit differential detection (x3−x1, y3−y1, x5−x3, y5−y3, . . . ) on the receiver side, the precoded data in each data can be correctly decoded.

The operation speed of the two 1-bit DQPSK precoders (Blocks 102 and 103) is set as a half of the total data rate in order to perform differential encoding in the odd and even channels. The differentially encoded DQPSK bits are then combined through two combiners (Block 108/109) after time alignment through time delay lines (Blocks 104 to 107). No commercial 2-bit DQPSK precoders are currently available, thus it is very costly to re-design the 1-bit DQPSK ASIC chip compared to our proposed approach.

The time alignment may be fine-tuned to ensure that the final output is in the original order.

Figure 2:
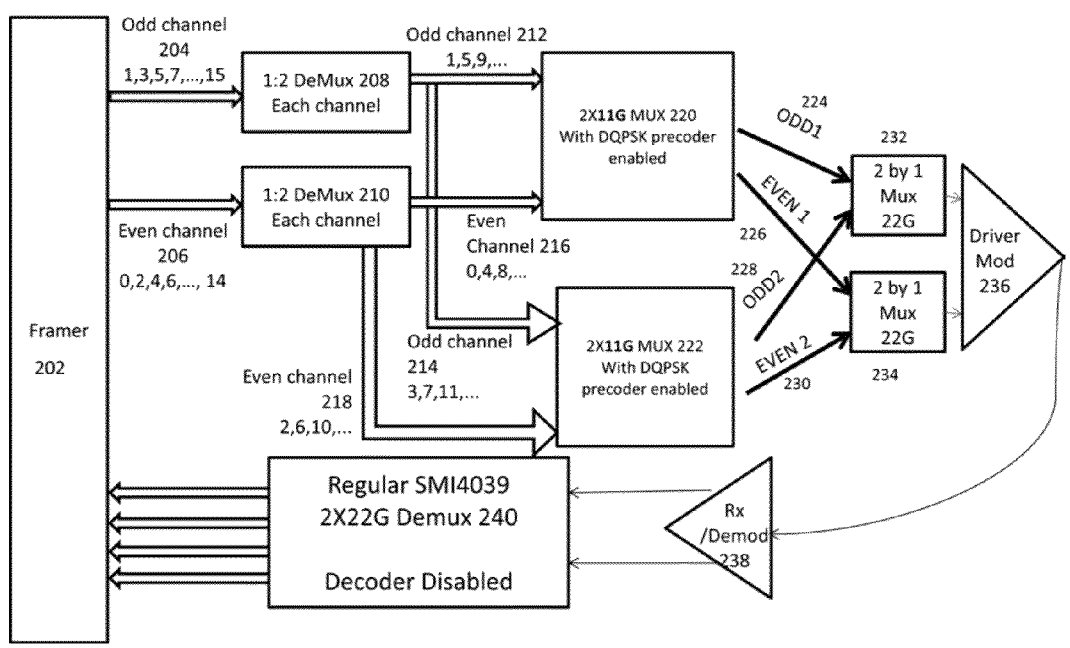
FIG. 2 depicts a block diagram that shows an implementation of a 2-bit DQPSK precoder as a combination of two 1-bit DQPSK precoders.

FIG. 2 shows a more practical block diagram for the system. With reference to FIG. 2, the output data of framer 202 is split into odd and even channels 204 and 206. Each channel passes through 1:2 demultiplexer (DeMux) 208 or 210 to further split into two sub-channels (212 and 214 for odd channel 204; 216 and 218 for even channel 206). 2×11G multiplexer (MUX) 220 takes in the output of sub-channel 212 and sub-channel 216 to perform 1-bit DQPSK precoding. And the same precoding rule is applied in MUX 222 as well. Then, odd signal 1 (224) and odd signal 2 (228) are fed into 2 by 1 multiplexer (22G) 232 to form 2-bit differential precoding output 1, as in the same manner as described above. Output 2 is generated from multiplexer (234) using the same method as output 1. The 2-bit differentially precoded outputs are amplified in modulator driver 236 to drive optical modulator 236 for producing optical signals, which are sent to receiver 238 for demodulation. Based on our approach, on the receiver side, a common chip such as SMI4039 can be used to demodulate the 2-bit differentially precoded bits by turning off its differential decoding function, since the 2-bit differential decoding is performed at the front-end of receiver 238.

Note that odd channel 204, even channel 206, and demultiplexers 208 and 220 in FIG. 2 may correspond to block 101 in FIG. 1. Odd channel 212 and even channel 216 in FIG. 2 can be corresponding to the odd channel in FIG. 1 and, similarly, odd channel 214 and even channel 218 in FIG. 2 can be corresponding to the even channel in FIG. 1.

The proposed design of 2-bit DQPSK precoders can be readily implemented in an actual optical DQPSK system because no change may be necessary in ASIC chips on the receiver side. The proposed 2-bit DQPSK precoders enable a DQPSK system to employ polarization switching, thus extending the maximum transmission reach and/or increasing a system margin.

The proposed multiplexing scheme can be scaled to a multi-symbol polarization-switching DQPSK system. The requirement of polarization modulators for the further multi-symbol polarization-switching DQPSK system will be relaxed with reasonable performance degradation with the proposed multiplexing scheme.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A method implemented in a transmission apparatus used in an optical fiber communications system for a polarization switched differential quaternary phase-shift keying (DQPSK) signal, the method comprising:
   splitting data into two or more data streams; inputting said two or more data streams to 1-bit DQPSK precoders to perform 1-bit DQPSK precoding;
   multiplexing inphase outputs of the 1-bit DQPSK precoders to generate a first output; and
   multiplexing quadrature outputs of the 1-bit DQPSK precoders to generate a second output,
   wherein an operation speed of the 1-bit DQPSK precoders is set to half of a total data rate to perform differential encoding of the two of more data streams,
   wherein the first and second outputs 1 and 2 have the following signals:
   output 1: x1 y1 x3 y3 x5 y5 . . .
   output 2: x0 y0 x2 y2 x4 y4 . . .
   where xn and yn represent nth data from odd and even channels, and each output has at least part of two independent data streams x and y and when performing 2-bit differential detection (x3-x1, y3-y1, x5-x3, y5-y3, . . . ) on a receiver side, precoded data in each data can be correctly decoded.

2. The method as in claim 1,
   wherein the two or more data streams comprise even and odd channels.

3. The method as in claim 1,
   wherein the 1-bit DQPSK precoding is preformed independently by each of the 1-bit DQPSK precoders.

4. The method as in claim 1,
   wherein the DQPSK precoders are driven by a clock at a half symbol rate.

5. The method as in claim 1, further comprising:
   time-aligning the inphase outputs and the quadrature outputs of the 1-bit DQPSK precoders with one or more time delay units.

6. The method as in claim 5,
   wherein the inphase outputs of the 1-bit DQPSK precoders are time-aligned so that the inphase outputs are in the original time order of the data.

7. The method as in claim 5,
   wherein the quadrature outputs of the 1-bit DQPSK precoders are time-aligned so that the quadrature outputs are in the original time order of the data.

8. A transmission apparatus used in an optical fiber communications system for a polarization switched differential quaternary phase-shift keying (DQPSK) signal, the transmission apparatus comprising:
   a splitting unit to split data into two or more data streams;
   1-bit DQPSK precoders to perform 1-bit DQPSK precoding for said two or more data streams;
   a first multiplexer to multiplex inphase outputs of the 1-bit DQPSK precoders to generate a first output; and
   a second multiplexer to multiplex quadrature outputs of the 1-bit DQPSK precoders to generate a second output,
   wherein an operation speed of the 1-bit DQPSK precoders is set to half of a total data rate to perform differential encoding of the two of more data streams, and
   the first and second outputs 1 and 2 have the following signals:
   output 1: x1 y1 x3 y3 x5 y5 . . .
   output 2: x0 y0 x2 y2 x4 y4 . . .
   where xn and yn represent nth data from odd and even channels, and each output has at least part of two independent data streams x and y and when performing 2-bit differential detection (x3-x1, y3-y1, x5-x3, y5-y3, . . . ) on a receiver side, precoded data in each data can be correctly decoded.

9. The transmission apparatus as in claim 8,
   wherein the two or more data streams comprise even and odd channels.

10. The transmission apparatus as in claim 8,
    wherein the 1-bit DQPSK precoding is preformed independently by each of the 1-bit DQPSK precoders.

11. The transmission apparatus as in claim 8,
    wherein the DQPSK precoders are driven by a clock at a half symbol rate.

12. The transmission apparatus as in claim 8, further comprising:
    a time delay unit to time-align the inphase outputs and the quadrature outputs of the 1-bit DQPSK precoders.

13. The transmission apparatus as in claim 12, wherein the inphase outputs of the 1-bit DQPSK precoders are time-aligned so that the inphase outputs are in the original time order of the data.

14. The transmission apparatus as in claim 12, wherein the quadrature outputs of the 1-bit DQPSK precoders are time-aligned so that the quadrature outputs are in the original time order of the data.

15. A method implemented in an optical fiber communications system for a polarization switched differential quaternary phase-shift keying (DQPSK) signal, the method comprising:

splitting data into two or more data streams;

inputting said two or more data streams to 1-bit DQPSK precoders to perform 1-bit DQPSK precoding;

multiplexing inphase outputs of the 1-bit DQPSK precoders to generate a first output; and multiplexing quadrature outputs of the 1-bit DQPSK precoders to generate a second output, wherein an operation speed of the 1-bit DQPSK precoders is set to half of a total data rate to perform differential encoding of the two of more data streams, wherein the first and second outputs 1 and 2 have the following signals:

output 1: x1 y1 x3 y3 x5 v5 ...

output 2: x0 v0 x2 y2 x4 y4 ...

where xn and yn represent nth data from odd and even channels, and each output has at least part of two independent data streams x and y and when performing 2-bit differential detection (x3-x1, y3-y1, x5-x3, y5-y3, ... ) on a receiver side, precoded data in each data can be correctly decoded.

16. The method as in claim 15, wherein the two or more data streams comprise even and odd channels.

17. The method as in claim 15, wherein the 1-bit DQPSK precoding is preformed independently by each of the 1-bit DQPSK precoders.

18. The method as in claim 15, wherein the DQPSK precoders are driven by a clock at a half symbol rate.

19. The method as in claim 15, further comprising:

time-aligning the inphase outputs and the quadrature outputs of the 1-bit DQPSK precoders with one or more time delay units.

20. The method as in claim 19, wherein the inphase outputs of the 1-bit DQPSK precoders are time-aligned so that the inphase outputs are in the original time order of the data or the quadrature outputs of the 1-bit DQPSK precoders are time-aligned so that the quadrature outputs are in the original time order of the data.

* * * * *